United States Patent
Qazi et al.

(10) Patent No.: US 7,979,431 B2
(45) Date of Patent: Jul. 12, 2011

(54) SYSTEM AND METHOD FOR AUTOMATICALLY MODIFYING A QUERY WITHIN A WEB BASED DATABASE SYSTEM

(75) Inventors: Farhan Qazi, Brampton (CA); Siamak Safarian, Richmond Hill (CA); YanJun An, Mississauga (CA); Galina Modilevski, Toronto (CA)

(73) Assignee: Teradata US, Inc., Dayton, OH (US)

( * ) Notice: Subject to any disclaimer, the term of this patent is extended or adjusted under 35 U.S.C. 154(b) by 838 days.

(21) Appl. No.: 11/772,566

(22) Filed: Jul. 2, 2007

(65) Prior Publication Data
US 2008/0126316 A1 May 29, 2008

Related U.S. Application Data

(60) Provisional application No. 60/817,906, filed on Jun. 30, 2006.

(51) Int. Cl.
*G06F 17/00* (2006.01)

(52) U.S. Cl. ........ 707/736; 707/706; 707/713; 707/732; 707/754

(58) Field of Classification Search .................. 707/101, 707/706, 713, 732, 736, 754
See application file for complete search history.

(56) References Cited

U.S. PATENT DOCUMENTS

2004/0073565 A1* 4/2004 Kaufman et al. ............. 707/101
2006/0069694 A1* 3/2006 Rossi et al. .................. 707/101
* cited by examiner

*Primary Examiner* — Sana Al-Hashemi
(74) *Attorney, Agent, or Firm* — Adam Bennett

(57) ABSTRACT

A query enhancer module providing a unique method to modify user submitted queries within a web-based, multi-tier enterprise solution. The user submitted query specifies data to be retrieved from a database. Without any user interaction the query enhancer module rewrites the query to specify a subset of the data specified in the user submitted query. This rewritten query is then executed against the database to retrieve the subset of the data. Generally, the subset set of the data comprises the amount of data that can be displayed on a single web page.

24 Claims, 6 Drawing Sheets

FIG. 5

| ○ | S00001 | | Maryville, TN | 0000775030754 | JACKS BUDDY BAR~XXXXXXXXXXXXXXXXXXXX-- | $0.94 | 00100\0030\0007\0159 |
| ○ | S00001 | | Maryville, TN | 0000450000824 | HOSTESS TWINKIES LIGHT~XXXXXXXXXXXXXXX-- | $2.44 | 00100\0030\0007\0159 |

Total Records: ( 454 )   Result Page:  1  2  3  4  5  Next 5 >   Go To Page [ ] of 19 (GO)   Rows Per Page: [25 ▽]   ↑Top of

SYSTEM AND METHOD FOR AUTOMATICALLY MODIFYING A QUERY WITHIN A WEB BASED DATABASE SYSTEM

CROSS REFERENCE TO RELATED APPLICATIONS

This application claims priority under 35 U.S.C. §119(e) to the following commonly-assigned patent application, which is incorporated herein by reference:

Provisional Application Ser. No. 60/817,906, entitled "DATA SERVICE LAYER INTELLIGENT SQL ENHANCER," filed on Jun. 30, 2006.

FIELD OF THE INVENTION

The present invention relates to methods and systems for automatically modifying a user submitted query to increase the efficiency of a web-based data processing system.

BACKGROUND

Modern enterprise database warehouses are generally deployed using web-based multi-tier architecture (often referred to as n-tier architecture). N-tier architecture is a client-server architecture in which an application is executed by more than one distinct software agents. For example, an application that uses middleware to service data requests between a user and a database employs multi-tier architecture.

The most widespread use of "multi-tier architecture" refers to three-tier architecture, which includes a presentation tier, a middle tier and a database tier. Typically each tier is developed and maintained as independent modules, most often on separate platforms.

Typically, the presentation tier, in the form of a user interface, runs on a desktop PC or workstation and uses a standard graphical user interface. The middle tier, in the form of functional process logic, may consist of one or more separate modules running on a workstation or application server. The database tier, in the form of a relational database management system ("RDBMS"), on a database server or mainframe contains the data storage logic. It will be appreciated that anyone of these tiers may be multi-tiered itself. The Teradata Demand Chain Management ("DCM") Solution is an example of one such system.

In systems, such as the Teradata DCM solution, a typical user uses the presentation tier via web pages to request data from the database. The presentation tier interacts with the middle tier, typically, by using Microsoft N-tier ASP/COM technologies. The middle tier contains business components and logic to assemble SQL queries corresponding to the user's request from the presentation tier. The database tier receives the SQL query generated by business tier and interacts with the RDBMS to execute the SQL query. The result set of the query is sent back to the middle tier, where it is rearranged and formatted. Once the middle tier is done processing the result set, the portion of the results that can fit on a single web page is sent back to the user.

It is not at all uncommon for a result set to contain thousands or hundreds of thousands of rows of data, however, a typical web page may only accommodate 25 to 50 rows. The common solution to this is to page the result set, which is a feature enabled by Microsoft's ADO and .NET platform. The problem with paging in this manner is that a huge chunk of unnecessary data (i.e. the entire result set specified by the SQL query) travels via the network from the database to the application server, before it can be paged. Moreover, a complete record set (containing all the data) is sent to the application server each time a new page is viewed. This has an impact on the application server memory and the bandwidth between the web server and the database server (if they are on separate machines).

It is an object of the present invention to provide a new and useful system and method for returning results from a database query.

BRIEF DESCRIPTION OF THE DRAWINGS

Benefits and advantages of the present invention will become apparent from the subsequent description of example embodiments, taken in conjunction with the accompanying drawings, in which:

FIG. 5 illustrates a portion of a web page with a navigation bar in the form of a page index, in accordance with an embodiment of the present invention.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

The method and system described herein is capable of rewriting a SQL query, such that when the rewritten query is executed against a database only a portion of the data specified in the original query is returned. In most cases, the portion returned is controlled by two parameters, which include page size (i.e. the number of rows that may be displayed on a web page) and current page (i.e. if one has been selected by the user submitting the query).

Figure 1:
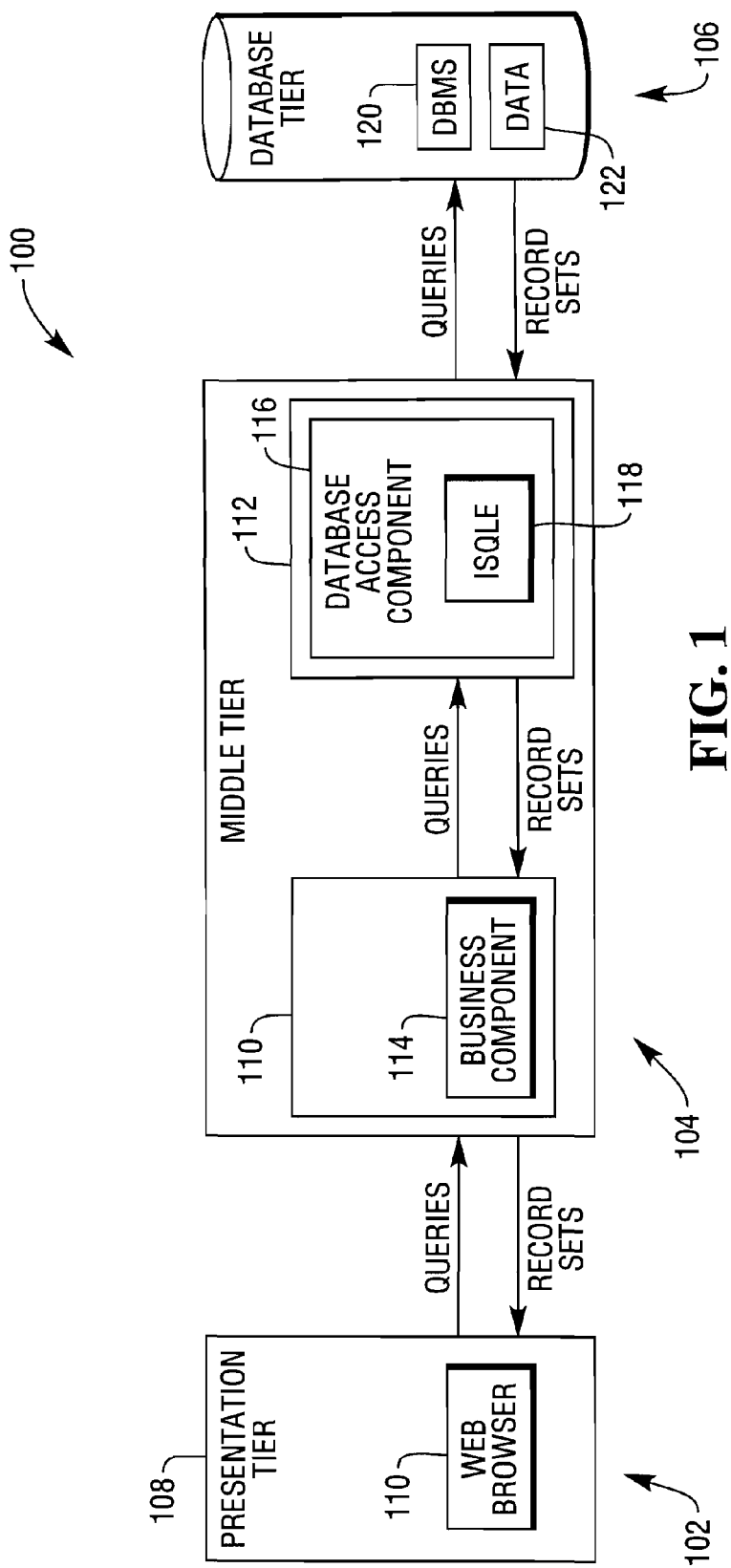
FIG. 1 provides a high level architecture diagram of a web based enterprise software system within a web-based three-tier architecture, in accordance with an embodiment of the present invention.

Referring now to FIG. 1, a high level architecture diagram of a web based enterprise software system 100, in the form of the Teradata Demand Chain Management ("DCM") solution, is shown. The DCM system 100 is implemented in a three-tier client-server architecture, which includes a presentation tier 102, a middle tier 104, and a database tier 106, and is an example of an environment in which the present invention can be deployed.

Figure 4:
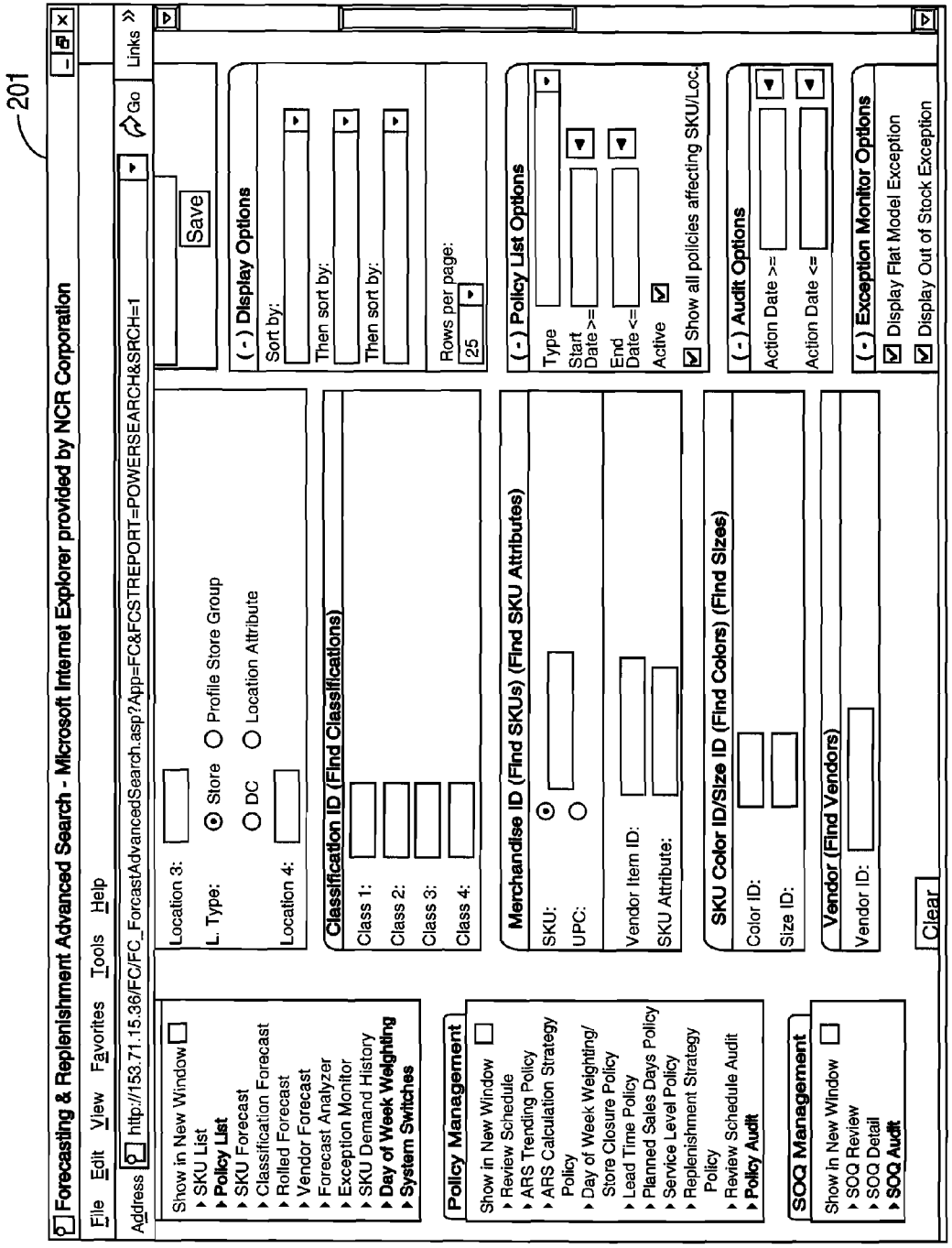
FIG. 4 illustrates a portion of a web page utilized for entry of search criteria, in accordance with an embodiment of the present invention.

The presentation tier 102 resides on PC 108, which includes a web browser 110. The PC 108 interfaces with middle tier 104 via web browser 110, allowing end users to submit queries to the DCM system 100. For example, FIG. 4 shows a search web page 401, through which a user can submit to the middle tier search criteria for a desired query. Similarly, FIG. 5 shows a portion of a results page 501 that includes a navigation bar (in the form of a page index) which allows a user to request a particular page of a result set corresponding to the initial request submitted via search page 401.

The middle tier 104 includes two sub-tiers—a business tier 110 and a data access tier 112, both running on web server 114. The business tier 110 contains business components 116, which includes, among other things, logic to assemble a SQL query statement corresponding to the search criteria of the user's request, and logic to move and processes data between the two surrounding tiers. Typically, this is done using Microsoft N-Tier ASP/COM technology. Once the SQL query is assembled it is passed to the data access tier 112.

This tier contains a database access component 116, which includes logic for storing and accessing data in the Database Tier 106. The database access component 116 further includes an Intelligent SQL Enhancer 118 ("ISQLE"), which comprises specific intelligent rules for modifying the SQL query. These modifications are performed so that the database tier returns to the middle tier 104 only a portion (i.e. subset) of the data specified by the search criteria entered by the user. The ISQLE may utilize several parameters (sometimes referred to as variable) in the process of modifying the original SQL query. These parameters include page size (i.e. the number of rows the browser 110 is set to display) and page number (if the user has selected a particular page). By utilizing these parameters the ISQLE rewrites the SQL query to specify a particular subset of data.

For example, a user submits an initial query, via the browser 110, which is set to display 25 rows per page. Based on the criteria specified by the user the result set would contain one thousand fifteen rows. In a prior art system the database would have returned all one thousand fifteen rows to the middle tier 104. However, in accordance with the present invention, after the business component 114 assembles the SQL query specifying the one thousand fifteen rows, the ISQLE 114 rewrites the SQL query to specify only the first 25 rows. Thus when the query is executed against the database 106, only rows 1 through 25 (i.e. page 1) are returned to the middle Tier 104, which in turn sends them to the presentation tier 102 along with a page index (such as the one at the bottom of results page 501) indicating the other pages that are available, but not returned. If the user wants to see another page he clicks on the desired page number (in the form of a hyperlink) in the page index. For example, if the user selects page 2 (i.e. rows 26 through 50), the ISQLE again rewrites the original SQL query submitted by the user, so that when it is executed against the database only rows 26 through 50 are returned to the middle tier 104.

It will be appreciated that the database access component 116 is the communication center between the DCM application and the database tier 106, such that it processes every query made to the DCM application. With the ISQLE functionality designed to be applied only to one spot in the code, it is very easy to maintain the code and very convenient to add new general rules. This is because no extra coding is required to implement each individual function. This also allows the ability to turn the functionality ON or OFF at any time at the web server by implementing a global switch.

The database tier 106, or simply database 106, includes a database management system ("DBMS") 120, such as Teradata or Oracle, and data storage 122 which is accessible to the DBMS. Once an SQL query is modified by the ISQLE, it is passed to the database 106 and executed against the DBMS 120, retrieving only the portion of the requested data that can be displayed on a single page of the web browser 110. This data is then passed to the business services tier 110 where it is rearranged and formatted, typically in the form of an HTML page that the user can view via his web browser 110.

It will be appreciated that by only fetching back enough data to populate a single result page, a significant reduction in network traffic between the middle tier 104 and the database tier 106 is accomplished, thereby freeing up network, memory and processor resources across the enterprise software solution 100.

It will also be appreciated that the DCM solution 100 must have the following system requirements:

1. A web based multi-tier architecture including a common architecture for a presentation tier 102, a business tier 110, a database access tier 112 and a database 106, such as a Teradata database by NCR Corporation;

2. A centralized COM component, such as the database access component 118, which provides access to the database 106 and reads all the SQL queries from every client.

3. A separate folder must exist and its name should be defined in the DCM application settings e.g. registry.

4. An Internet Information Server (IIS) on a Windows 2000/2003 server is required. The Teradata DCM Solution is designed to use XML as the universal data format to pass the data between the multi-tiers and to the external system. A Microsoft XML3.0 parser must be included on an application server.

5. An Internet Explorer 6.0 is required to be installed on the client's PC 108 for the user to access the Teradata DCM Solution.

It will be appreciated that the ISQLE described herein may be used in any of a variety of N-tiered database systems (other than the DCM solution), that will have their own particular system requirements.

Similarly, those skilled in the art will recognize that the exemplary environment illustrated in FIG. 1 is not intended to limit the present invention. Indeed, those skilled in the art will recognize that other alternative environments may be used without departing from the scope of the present invention. For example, the 3-tier architecture of the present invention could be implemented on one, two, three or more independent machines.

Similarly any of the tiers may be distributed across multiple machines. For example, in some embodiments the presentation tier may be distributed across a thin client work station (instead of a PC) and a remote server. Likewise, in some embodiments the business components 118 may be distributed across multiple servers.

It will further be appreciated, that the software components and/or data shown in a particular tier may be tangibly embodied in any data storage device located within the enterprise software solution 100 and/or a remote system or device can interface with the system 100.

Figure 2:
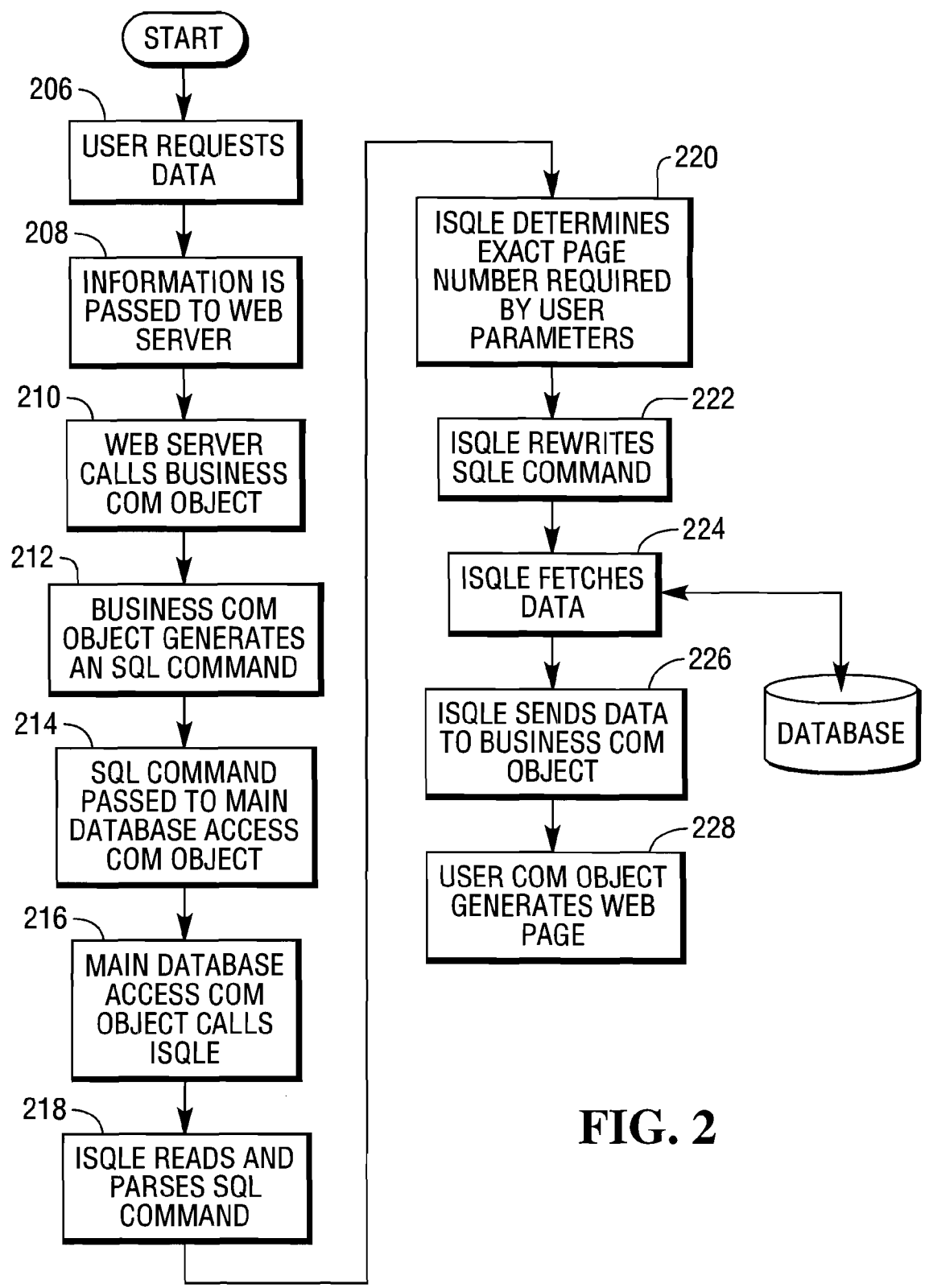
FIG. 2 provides a high level work flow diagram illustrating operation of an Intelligent SQL Enhancer in accordance with an embodiment of the present invention.

The ISQLE will now be explained in further detail with reference to FIGS. 2, 3A and 3B. FIG. 2 provides a sequence diagram illustrating the operation of the DCM solution 100 utilizing the ISQLE 118. Operation begins when a user requests data, in step 206. Typically this request is made by selecting a particular query to be performed via web page 401 or by clicking on a desired page listed in the page index 501. In response to the user's selection information is passed from the client web browser 110 to the web server 112, at step 208. After the web server 112 accepts the request, it will send a function call to the appropriate business Com object, at step 210, which will be loaded in the Windows web server memory. The business COM object receives the function call and generates a SQL query, at step 212, based on the user's request. The generated SQL query is then passed to the main database access COM object, at step 214, to obtain data. The main database access COM object is already loaded in the memory at the installation time and therefore will accept the call from the business COM object. The main database access COM object receives the function call and initializes memory variables and calls the ISQLE, at step 216, to read and parse the SQL query for proper syntax and validates it, at step 218, by using its own specific rules defined inside the ISQLE. The ISQLE then determines user set parameters, such as number of row per page and the exact page number requested by the user (if one has been selected), and calculates the starting and ending row numbers expecting from the database result set, at step 220. Typically, the user set parameters are variables that are supplied with the request from the user.

Having identified the exact start and ending row numbers, at step 222, the ISQLE rewrites the SQL query, so that when executed the database 106 only returns the rows for the page requested by the user. Once the SQL query has been rewritten, the ISQLE fetches the user requested data, at step 224, by executing it against the database. Then, at step 226, the ISQLE sends the data back to the business object to be formatted and placed on a web page, at step 228, for viewing by the user.

Typically, the ISQLE also checks other rules to enhance the SQL query, e.g. adds a locking statement to any query that starts with a "Select" statement.

It will be appreciated that by only retrieving enough data for one web page the overall system performance is improved.

Figure 3A:
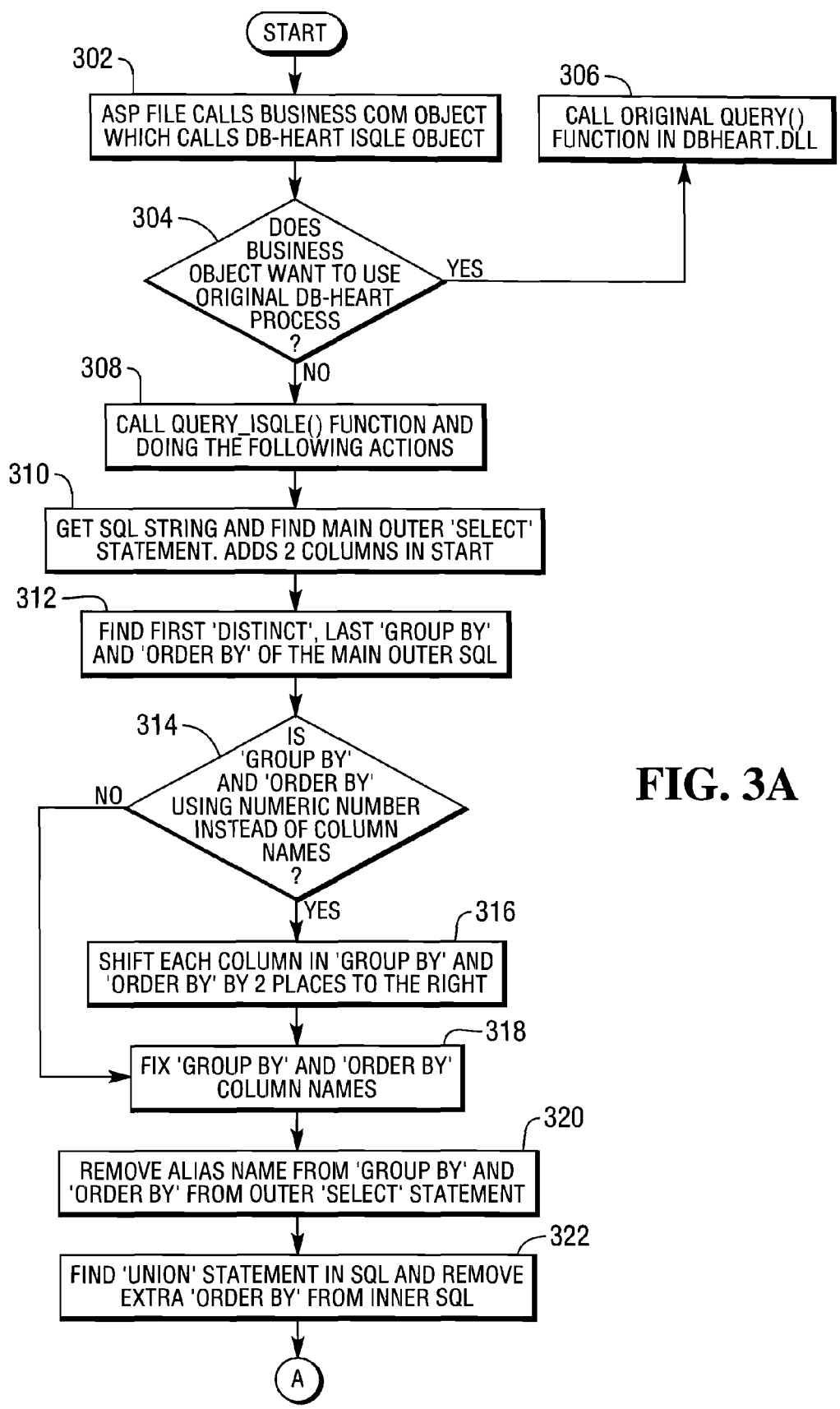
FIGS. 3A and 3B provide a detailed work flow diagram, illustrating operation of an Intelligent SQL Enhancer, in accordance with an embodiment of the present invention.
Figure 3B:
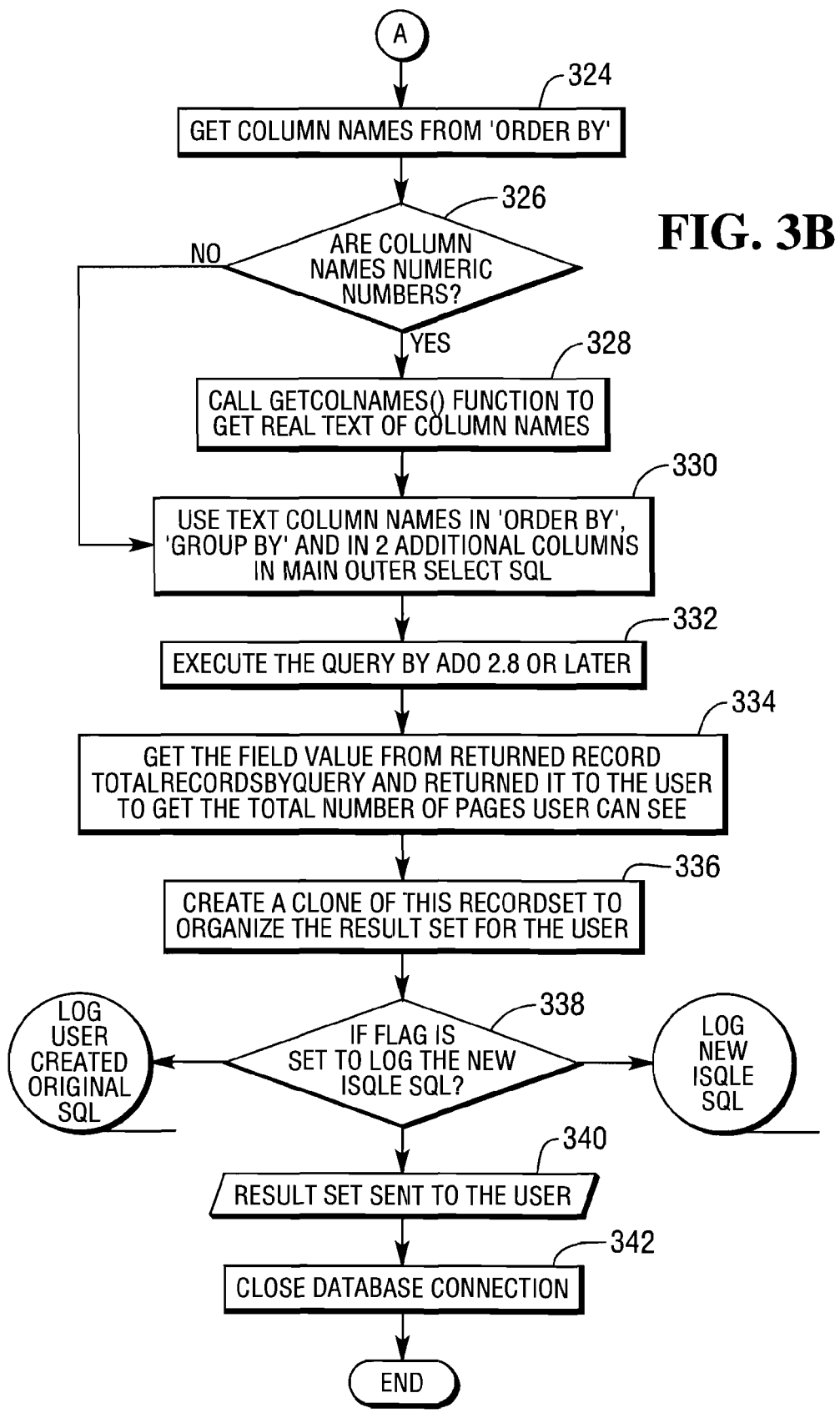

Referring now FIGS. 3A and 3B, the operation of one embodiment of the ISQLE is illustrated in a work flow diagram, in which the major steps shown include:

Step 302—Operation begins when Active Server Page (ASP) file calls the Business COM object, which generates an SQL query base on user input parameters. This is initiated when a user requests data by either refreshing a page or clicking a hyper link on a DCM application menu.

Step 304—The business COM object then determines if the standard database access object or the ISQLE is to be used, i.e. depending if the ISQLE switch is ON or OFF. Typically, the ISQLE switch can be turned on or off at any time by accessing the web server settings, thus allowing development teams and/or clients to control the availability of the ISQLE feature.

Step 306—If the business COM object determines the standard database access object should be used, i.e. the ISQLE switch if OFF, it calls the standard Query( ) function, and the query is processed in accordance with the prior art.

Step 308—Conversely, if the business COM object determines not to use the standard database access object, i.e. the ISQLE switch is ON, it calls the Query_ISQLE( ) function.

Step 310—First the ISQLE retrieves the SQL query generated by the business COM object and finds the main outer 'Select' statement, wherein in it adds two additional columns to the start of the SQL query.

Step 312—Next the ISQLE finds the first 'Distinct', last 'Group by' and 'Order by' of the main outer SQL query.

Step 314—The ISQLE then determines if the 'Group by' and 'Order by' are using numeric numbers instead of column names.

Step 316—If 'Group by' and 'Order by' are using numeric numbers instead of column names each column is shifted by two places to the right and then proceeds to step 318. Though, if 'Group by' and 'Order by' are not using numeric numbers, step 316 is skipped and the ISQLE proceeds to step 318.

Step 318—The ISQLE Fixes the 'Group by' and 'Order by' column names.

Step 320—The ISQLE then removes the Alias name from 'Group by' and 'Order by' from outer 'Select' statement.

Step 322—The ISQLE then finds the 'Union' statement in SQL query and remove extra 'Order by' from inner SQL query.

Step 324—The ISQLE then gets column name from 'Order by'.

Step 326—The ISQLE then determines if the column names are numeric numbers.

Step 328—If yes, call GetColNames( ) function to get real text of column names. Though, if no, step 328 is skipped and the ISQLE proceeds to step 330.

Step 330—Use text column names in 'Order by', 'Group by' and in two additional columns in main outer 'Select' statement of the SQL query.

Step 332—The Query is executed by the database access component, typically this will be ADO (ActiveX Data Objects) 2.8 or a later version.

Step 334—The ISQLE gets the field value from returned record TotalRecordsbyQuery and returns it to the user to indicate the total number of pages user can see.

Step 336—A clone of this record set is then created and used to organize the results set for the user.

Step 338—The original SQL query is logged and if a flag is set to log the new SQL query it will also be logged. It will be appreciated that by logging the original SQL query, the user can still finds his original SQL query in the DCM SQL log folder to debug and look for any errors if needed.

Step 340—The result set is then sent to the user.

Step 342—Finally, the Database Connection is closed.

The following is an example of an original SQL query generated by the business COM object, before the ISQLE rewrites it.

```
SELECT
       location.locationtype, location.locationid, location.description
FROM
       grouploc LS,Location
WHERE      (Location.LocationType = 'S')
   AND     (Location.LocationType = LS.LocationType )
   AND     (Location.LocationID = LS.LocationID)
   AND     (LS.groupid = 1)
   AND     location.LocationEnddate>'20050321'
   Group   By location.locationtype, location.locationid,
           location.description
   Order   By location.locationid, location.description
```

Typically, such a SQL query will be generated when a user request data via search web page 401. Executing this SQL query could return thousands of rows and may need 10-15 seconds to complete. However, by implementing the ISQLE the original SQL query is automatically (i.e. no user interaction) rewritten, so that the database 106 only returns 25 rows to the middle tier, thereby allowing the results set, in the form of result page 501, to be returned much quicker. If a user then wants to see page 2, he simply clicks on page 2, and the original SQL query is again modified (as shown below) so that only rows 26 through 50 will be returned.

```
SELECT   *
FROM (
SELECT      row_number( ) over (
Order By location.locationtype,   location.locationid) RowNumber,
```

-continued

```
Count(1) over( ) TotalRecords, location.locationtype, location.locationid,
location.description
FROM grouploc LS,Location
WHERE    (Location.LocationType = 'S')
   AND   (Location.LocationType = LS.LocationType )
   AND   (Location.LocationID = LS.LocationID)
   AND   (LS.groupid = 1)
   AND   location.LocationEnddate>'20050321'
   Group By location.locationtype, location.locationid,
         location.description    ) tmpSelectTable
Where RowNumber >= 26
   And   RowNumber <=50
   Order By location.locationid, location.description
```

In the above example, the ISQLE created an intelligent wrapper around the original SQL query. This wrapper is created according to specific rules that were designed to preserve all the features of the original SQL query, such as filtering, grouping and sorting of the resulting data. More specifically, two additional columns were added to the original SQL query to minimize the workload and filter the incoming result. The Group By clause has been moved inside the inner SQL while the Order By clause has been moved to the end of the SQL.

When this modified SQL query is executed the database will return a dataset consisting of only 25 rows, specifically row number 26 through row number 50, i.e. the row corresponding to page two. Typically, the row number is obtained by using the same 'order by' provided in the original SQL query. That way the same required results in the same desired order will be obtained.

It will be appreciated that this is merely a simple example to illustrate how one embodiment of the ISQLE parses and changes a SQL query. Most embodiments of the ISQLE can handle various different types of SQL and will parse and modify an SQL query according to the type of SQL. For example, the ISQLE is designed to handle Oracle's, Microsoft's, and Teradata's versions of SQL.

The invention described above, was discussed in relation to the Teradata Demand Chain Management solution. However, the improvement described herein, referred to as the Intelligent SQL Enhancer, may be used in any variety of database applications.

Similarly, the foregoing description of various embodiments of the invention has been presented for purposes of illustration and description. It is not intended to be exhaustive or to limit the invention to the precise form disclosed. Many alternatives, modifications, and variations will be apparent to those skilled in the art in light of the above teaching. Accordingly, this invention is intended to embrace all alternatives, modifications, equivalents, and variations that fall within the spirit and broad scope of the attached claims.

The invention claimed is:

1. A method for use in a data processing system which includes a presentation tier, a database tier, and a middle tier between the presentation and database tiers, wherein the presentation tier has a user interface, the database tier has a database, and the middle tier has an intelligent query language enhancer for modifying an original user query from the user interface with no further user interaction from a user after the user has provided the original user query via the user interface, the method comprising:
   receiving at the user interface an original user query from a user, wherein the original user query specifies a user requested dataset to be retrieved from the database;
   automatically at the intelligent query language enhancer, with no further user interaction after the user has provided the original user query via the user interface, modifying the original user query to provide a modified user query which specifies a subset of the user requested dataset; and
   executing at the intelligent query language enhancer the modified user query and not the original user query against the database to retrieve from the database only the subset of the user requested dataset and not the entire user requested dataset and thereby to reduce network traffic between the database in the database tier and the intelligent query language enhancer in the middle tier.

2. The method of claim 1, wherein automatically modifying the original user query to provide the modified user query further comprises:
   determining a value for at least one page variable; and
   based on the value of the at least one page variable, calculating a starting row number and an ending row number for the subset of the user requested dataset.

3. The method of claim 2, wherein the at least one page variable includes at least one of the following:
   a page size variable; and
   a page number variable.

4. The method of claim 1, further comprising:
   determining whether a modification switch is set to an on position prior to automatically modifying the original user query to provide the modified user query.

5. The method of claim 1, wherein the original user query is in the form of an SQL statement.

6. A method for use in a data processing system which includes a presentation tier, a database tier, and a middle tier between the presentation and database tiers, wherein the presentation tier has a web browser, the database tier has a database, and the middle tier has an intelligent SQL enhancer (ISQLE) for rewriting an original SQL query from the web browser with no further user interaction from a user after the user has provided the original SQL query via the web browser, the method comprising:
   receiving from a user at the web browser an original SQL query that specifies a user requested dataset to be retrieved from the database;
   automatically at the ISQLE, with no further user interaction after the user has provided the original SQL query, rewriting the original SQL query to provide a rewritten SQL query which specifies a subset of the user requested dataset; and executing at the ISQLE the rewritten SQL query and not the original SQL query against the database to retrieve from the database only the subset of the user requested dataset and not the entire user requested dataset and thereby to reduce network traffic between the database in the database tier and the ISQLE in the middle tier.

7. The method of claim 6, wherein automatically rewriting the original SQL query to provide the rewritten SQL query further comprises:
   determining a value for at least one page variable;
   based on the value of the at least one page variable, calculating a starting row number and an ending row number for the subset of the user requested dataset; and
   rewriting the original SQL query to specify only the starting row number and the ending row number and the rows therebetween.

8. The method of claim 7, wherein the at least one page variable includes at least one of the following:
   a page size variable; and
   a page number variable.

9. In a data processing system including a database, a server computer system, a software application residing on the server computer system, and a client computer system, a method comprising the steps of:
- providing to a user of the client computer system a first electronic page from the software application;
- generating by the software application a first set of instructions in response to a first user query submitted by the user through the first electronic page, wherein the first set of instructions specify a dataset to be retrieved from the database;
- rewriting by the software application, with no further user interaction after the user has submitted the first user query through the first electronic page, the first set of instructions to provide a second set of instructions which is different from the first set of instructions to specify a subset of the dataset to be retrieved from the database;
- executing by the software application the second set of instructions and not the first set of instructions against the database to retrieve from the database only the subset of the dataset and not the entire dataset and thereby to reduce network traffic between the database and the software application residing on the server computer system; and
- providing to the user of the client computer system a second electronic page which includes the subset of the dataset.

10. The method of claim 9, wherein the first electronic page and second electronic page are in the form of a web page.

11. A data processing system comprising:
a database for storing and accessing data;
a client computer; and
a server computer operable to:
- receive from a user via the client computer an original user query that specifies a dataset to be retrieved from the database;
- automatically, with no user interaction after the user has provided the original user query, modify the original user query to provide a modified user query which specifies a subset of the dataset; and
- execute the modified user query and not the original user query against the database to retrieve only the subset of the dataset and not the entire dataset and thereby to reduce network traffic between the database and the server computer.

12. The data processing system of claim 11, wherein the server computer is further operable to present the subset of the dataset to the user via an electronic page sent to the client computer.

13. The data processing system of claim 11, wherein the server computer is further operable to:
- determine a value for at least one page variable;
- based on the value of the at least one page variable, calculate a starting row number and an ending row number for the subset of the dataset, wherein the original user query is modified to return only the data between the starting row number and the ending row number.

14. The data processing system of claim 13, wherein the at least one page variable includes at least one of the following:
a page size variable; and
a page number variable.

15. The data processing system of claim 11, wherein the server computer first determines that a modification switch is set to an on position before the original user query is automatically modified.

16. A data processing system comprising:
a database for storing and accessing data;
a client computer including a web browser; and
a server computer operable to:
- receive from a user via the web browser of the client computer an original SQL query that specifies a dataset to be retrieved from the database;
- generate a first set of instructions based on the original SQL query, wherein the first set of instructions are executable against the database to retrieve the dataset;
- with no further user interaction after the user has provided the original SQL query, rewrite the first set of instructions as a second set of instructions which is different from the first set of instructions, wherein the second set of instructions specify a subset of the dataset; and
- execute the second set of instructions and not the first set of instructions against the database to retrieve only the subset of the dataset and not the entire dataset and thereby to reduce network traffic between the database and the server computer.

17. A data processing system comprising:
a database;
a server computer including a software application;
a client computer system where a user is presented with a first electronic page from the software application,
wherein the first electronic page is used by the user to submit to the server computer an original user query that specifies data to be retrieved from the database, and
wherein the software application modifies, with no further user interaction after user has submitted the original user query via the first electronic page, the original user query provide a modified user query which specifies a subset of the data, and
wherein the software application executes the modified user query and not the original user query to retrieve from the database only the subset of the data and thereby to reduce network traffic between the database and the software application, and
wherein the software application presents the retrieved subset of the data to the user via a second electronic page.

18. An article of manufacture tangibly embodied on a computer readable medium embodying logic that when executed enable an intelligent query language enhancer to:
- receive original instructions for the execution of an original user query, wherein the original instructions specify a first dataset to be retrieved from a database;
- modify, with no further user interaction after the original user query has been received, the original instructions to provide modified instructions which specify a second dataset to be retrieved from the database, wherein the second dataset is a subset of the first dataset; and
- execute the modified instructions and not the original instructions against the database to retrieve from the database only the second dataset and not the first dataset and thereby to reduce network traffic between the database and the intelligent query language enhancer.

19. The article of manufacture of claim 18, further including logic to:
- determine a value for at least one page variable; and
- based on the value of the at least one page variable, calculating a starting row number and an ending row number for the second dataset which is a subset of the first dataset.

20. The article of manufacture of claim 19, wherein the at least one page variable includes at least one of the following:
a page size variable; and
a page number variable.

21. The article of manufacture of claim 19, further including logic to determine whether a modification switch is set to an on position prior to modifying the original instructions to provide the modified instructions.

22. The article of manufacture of claim 19, wherein the original instructions are in the form of an SQL statement.

23. The article of manufacture of claim 21, further including logic to add a locking statement to all SQL statements that start with a Select statement.

24. An article of manufacture tangibly embodied on a computer readable medium embodying logic that when executed enable an intelligent query language enhancer to:

provide to a user of a client computer a first web page;

generate original instructions in response to an original user query submitted by the user through the first web page, wherein the original instructions specify a first dataset to be retrieved from a database;

modify, with no further user interaction after the original user query has been submitted by the user, the original instructions to provide modified instructions to specify a second dataset which is a subset of the first dataset to be retrieved from the database;

execute the modified instructions and not the original instructions against the database to retrieve from the database only the second dataset which is subset of the first dataset and not the first dataset and thereby to reduce network traffic between the database and the intelligent query language enhancer; and provide to the user of the client computer a second web page which includes the second dataset which is a subset of the first dataset.

* * * * *